United States Patent [19]

Rehmer et al.

[11] Patent Number: 5,294,688
[45] Date of Patent: Mar. 15, 1994

[54] UV-CROSSLINKABLE COPOLYMERS

[75] Inventors: Gerd Rehmer, Beindersheim; Gerhard Auchter, Bad Duerkheim; Andreas Boettcher, Nussloch; Lothar Franz, Mutterstadt; Helmut Jaeger, Bobenheim, all of Fed. Rep. of Germany

[73] Assignee: BASF Aktiengesellschaft, Ludwigshafen, Fed. Rep. of Germany

[21] Appl. No.: 974,818
[22] Filed: Nov. 16, 1992

Related U.S. Application Data

[63] Continuation of Ser. No. 578,774, Sep. 7, 1990, abandoned.

Foreign Application Priority Data

[30]

Sep. 9, 1989 [DE] Fed. Rep. of Germany ....... 3930097

[51] Int. Cl.$^5$ ................. C08F 224/00; C08F 226/06; C08F 228/06; C08J 3/28
[52] U.S. Cl. ..................................... 526/260; 522/35; 522/152; 522/153; 522/904; 522/905; 522/257; 526/258-260; 526/270
[58] Field of Search ................... 522/34, 35, 152, 153, 522/904, 905; 526/257, 258, 260, 266, 270

[56] References Cited

U.S. PATENT DOCUMENTS

| | | |
|---|---|---|
| 3,214,492 | 10/1965 | Tocker. |
| 3,229,478 | 1/1966 | Alonso. |
| 3,429,852 | 2/1969 | Skoultchi. |
| 4,530,746 | 7/1985 | Azuma et al. ........................ 522/31 |

FOREIGN PATENT DOCUMENTS

| | | |
|---|---|---|
| 0207257 | 1/1987 | European Pat. Off. . |
| 0208856 | 1/1987 | European Pat. Off. . |
| 0246848 | 11/1987 | European Pat. Off. . |
| 0281941 | 9/1988 | European Pat. Off. ............. 522/904 |
| 0377191 | 7/1990 | European Pat. Off. ............. 522/34 |
| 2818763 | 11/1978 | Fed. Rep. of Germany. |
| 3641436 | 6/1988 | Fed. Rep. of Germany. |
| 3820463 | 12/1989 | Fed. Rep. of Germany. |
| 42-5433 | 3/1942 | Japan ................................ 526/257 |

OTHER PUBLICATIONS

Patents Abstracts of Japan, JP-A-0224-687, Apr. 20, 1984.
J. Macromol. Sci.-Chem., A21 (8&9), pp 979-995, 1984, W. J. Bailey, et al., "Synthesis of Functionally-Terminated Oligomers by Free Radical Ring-Opening Polymerization".
J. Macromol. Sci-Chem., A25(1), pp. 27-40, 1987, Cai--Yuan Pan, et al., "Copolymerization of 2--phenyl-4-Methylene-1,3-Dioxolane with Methyl Methacrylate and Acrylonitrile".
Acta Polymerica, 39, 1988, No. 7, pp. 335-341, J. Bailey, et al., "Recent Advances in Free Radical Ring-Opening Polymerization".
Journal of Polymer Science: Polymer Letters Edition, vol. 21, 1983, pp. 373-380, H. Mark, et al., "Photoinitiated Ring-Opening Polymerization of 2-Methylene-1,-3-Dioxepane".

*Primary Examiner*—Marion E. McCamish
*Assistant Examiner*—Arthur H. Koeckert
*Attorney, Agent, or Firm*—Oblon, Spivak, McClelland, Maier & Neustadt

[57] ABSTRACT

The invention relates to UV-crosslinkable copolymers built up from
A) from 99.5 to 75% by weight of olefinically unsaturated monomers,
B) from 0.5 to 25% by weight of unsaturated compounds of the formula I

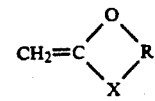

and
C) from 0.01 to 10% by weight of copolymerizable, olefinically unsaturated acetophenone and/or benzophenone derivatives containing no phenyl group having a free hydroxyl group in the ortho-position to the carbonyl group, where
X is O, S or NR$^1$ and
R is unsubstituted or substituted C$_2$- to C$_6$-alkylene, and
R$^1$ is C$_1$- to C$_8$-alkyl or phenyl.

The copolymers according to the invention are suitable, after crosslinking, as coating agents, impregnants or adhesives and in particular as contact adhesives.

15 Claims, No Drawings

UV-CROSSLINKABLE COPOLYMERS

This application is a continuation of application Ser. No. 07/578,774, filed on Sep. 7, 1990, now abandoned.

The present invention relates to UV-crosslinkable copolymers based on cyclic, olefinically unsaturated monomers which polymerize with ring opening, said monomers preferably being used in solvent-free form, for example as melts for coating sheet-like substrates and/or moldings made of metal, plastic, paper, board, leather and/or inorganic materials, and in the majority of cases having contact adhesive properties.

Contact adhesives are widely used for bonding, with solutions thereof still in frequent use today. In this group of products, the solvents are important aids for converting the polymers into a processible state. In addition, the liquid aggregate state has the further important function of wetting the substrate surface, which is an important prerequisite for adhesion. The solvents may be aliphatic or aromatic, such as toluene, acetone, chloroform, ethyl acetate or the like, and must be evaporated after application of the contact adhesive solution to the particular substrate, which means that a solvent recovery plant is generally necessary since otherwise considerable environmental pollution due to solvent vapors would occur.

Although the use of aqueous contact adhesive dispersions avoids such disadvantages, the drying of aqueous preparations requires considerable energy and only allows relatively low production rates, in particular at large adhesive thicknesses.

The most advantageous way of applying contact adhesives is via a melt of the adhesive, since it is then not necessary to remove any solvent.

Solvent-free hot-melt adhesive materials (see, for example, U.S. Pat. No. 3,229,478) have been known for a long time, and solvent-free adhesive materials have also been disclosed recently. These are so-called one- and multiple-pack systems.

A disadvantage of the known non-reactive hot-melt adhesives is the low heat resistance of their bonds and their oxidation sensitivity, in particular at elevated temperature. Due to their thermoplastic carrier, hot-melt adhesive materials must be exposed to high processing temperatures of from about 180° C. to 270° C. in order to ensure adequate heat resistance of their bonds. Materials which can be processed at relatively low temperatures do not usually have high heat resistance.

The contact adhesives employed here are, for example, block copolymers of styrene and isoprene or butadiene, as described, for example, in U.S. Pat. No. 3,229,478. However, hot-melt adhesives of this type require temperatures usually above 180° C. in order to be adequately free flowing during the coating operation. These polymers also have low resistance to atmospheric oxygen, heat, light and solvents.

A remedy is provided by reactive hot-melt adhesive materials, which, after application, are activated, for example by exposure to atmospheric moisture, and crosslink. However, this sometimes requires relatively long waiting times and monitoring of the atmospheric humidity.

Reactive one-pack systems, in which a blocking agent is liberated, for example by heating, have a limited, frequently very short shelf life.

In multicomponent systems, the reactants must be mixed homogeneously before processing. However, their limited pot time, within which they must be applied, frequently causes problems, in particular during machine stoppages.

Polymerizable coating materials and paints which can be cured by means of ionizing radiation, such as electron beams or UV radiation, have also been known for a long time. These products generally contain olefinically unsaturated monomers, olefinically unsaturated oligomers and/or polymers and so-called photoinitiators and may contain synergistic compounds. It is necessary for them to be stabilized against premature polymerization, which would reduce the shelf life, which has the disadvantage that their overall reactivity is reduced. In addition, supply of thermal energy for regulating the viscosity must not result in premature reaction.

The viscosity can be modified either by adjusting the temperature or by adding monomers; a disadvantage here is that the monomers frequently have irritant properties, i.e. are physiologically unacceptable.

Moreover, good contact adhesive properties are only achieved if the irradiation takes place under an inert gas atmosphere.

The outlined problems are described in greater detail, for example, in German Laid-Open Application DE-OS 36 41 436.

A practicable way of preparing solvent-free, UV-crosslinkable binders is the double-bond functionalization of suitably reactive oligomers or polymers.

Thus, EP-A 0 207 257 describes radiation-curable binders based on (meth)acrylic-functional polyesters. EP-A 0,208,856 describes contact adhesives based on radiation-curable, (meth)acrylate-containing polyesters. However, it is disadvantageous that the functionalization must be achieved using polymerization-analogous reactions.

A further disadvantage of these substances is that a photoinitiator must be admixed for the UV curing, which makes migration of photodegradation products after curing possible; this problem is discussed in German Laid-Open Application DE-OS 36 41 436, page 4, line 24 ff.

An important property for the mechanical processibility of high-melting materials is their behavior on application using various applicators, such as nozzles, knife coaters, rolls, etc. In particular in the case of nozzle application, hot-melt materials which do not tend, for example, to form "cobwebs" during application are required.

It is therefore an object of the present invention to provide UV-crosslinkable materials, in particular UV-crosslinkable hot-melt adhesive materials, which do not have the said disadvantages of the known materials; it should be possible to crosslink them, in particular in air, they should have high reactivity towards UV radiation, should be substantially free from solvents and unsaturated monomers, should be low-odor, discolor as little as possible, have sufficiently low melt viscosity at below 120° C., and, in the crosslinked state, have high tack, high cohesion, particularly at elevated temperature, and high peel strength.

We have found that this object is achieved according to the invention by UV-crosslinkable copolymers built up from A) from 99.5 to 75% by weight of olefinically unsaturated monomers, B) from 0.5 to 25% by weight of unsaturated compounds of the formula I

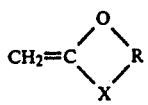

and

C) from 0.01 to 10% by weight of copolymerizable, olefinically unsaturated acetophenone and/or benzophenone derivatives containing no phenyl groups having a free hydroxyl group in the ortho-position to the carbonyl group, where X is O, S or $NR^1$ and R is unsubstituted or substituted $C_2$- to $C_6$-alkylene, and $R^1$ is $C_1$- to $C_8$-alkyl or phenyl.

Examples of substituents for the alkylene radicals R are $C_1$- to $C_4$-alkyl or $C_1$- to $C_4$-alkoxy, such as methyl, ethyl, butyl, methoxy or ethoxy.

Compounds of the formula I which polymerize by means of free radicals with ring opening are known from the papers by W. J. Bailey et al.[1-3] and from Japanese Patent Application J6 0224-687-A.

[1] J. Makromol. Sci.-Chem. A2 (8 and 9), (1984), pp. 979–995
[2] J. Makromol. Sci.-Chem. A25 (1), (1987), pp. 27–40
[3] Acta Polyaerica 39 (1998), No. 7, pp. 335–341

Thus, inter alia, copolymers of cyclic ketene acetals are described in the literature for the preparation of oligomers which are terminated by functional groups; likewise, copolymers of olefinically unsaturated ketene amino acetals (hemiaminals) are also known: see J. Kamromol. Sci.-Chem., A21(8&9), (1984), pp. 979–995.

In addition, the photochemically initiated ringopening polymerization of 2-methyl-1,3-dioxepan is described: see J. Polym. Sci., Polym. Lett. Ed., 21(5), 373–380.

The copolymers according to the invention differ from the known polymers particularly through their composition and, associated therewith, their unexpected properties.

In general, up to 25% by weight, in particular up to 20% by weight, preferably from 1 to 15% by weight, based on the total weight of the monomers employed, of the olefinically unsaturated, cyclic monomers of the formula I which polymerize with ring opening are used for the preparation of the copolymers according to the invention.

Specific examples are 2-methylene-1,3-dioxepan, 2-methylene-1,3-dioxolane, N-methyl-2-methyleneoxazolidine and 2-methylene-1,3-thiolane, preferably 2-methylene-1,3-dioxepan and N-methyl-2-methyleneoxazolidine.

These monomers can be used alone or in the form of mixtures. Particular preference is given to mixtures of 2-methylene-1,3-dioxepan and N-methyl-2-methyleneoxazolidine.

Examples of suitable monomers A) are monoolefinically unsaturated monocarboxylic acid esters containing from 4 to 21 carbon atoms, in particular esters of acrylic acid or methacrylic acid, and vinyl esters.

Examples of acrylic and methacrylic acid esters of alkanols containing from 1 to 18 carbon atoms are methyl acrylate, ethyl acrylate, n-butyl acrylate and methacrylate, isobutyl acrylate and methacrylate, isoamyl acrylate and methacrylate, 2-ethylhexyl acrylate and methacrylate, isooctyl acrylate and methacrylate, propyl acrylate, isopropyl acrylate, methyl methacrylate, decyl acrylate and methacrylate, and dodecyl acrylate and methacrylate.

A particularly suitable vinyl ester is vinyl propionate, and vinyl acetate, vinyl formate and vinyl butyrate are also suitable. A content of from 50 to 95.5% by weight of copolymerized acrylates and/or methacrylates of alkanols containing from 2 to 8 carbon atoms is particularly interesting.

(Meth)acrylates derived from alkanols having from 1 to 3 carbon atoms or from tert.-butyl alcohol are generally present in the copolymers for adhesives to an extent of not more than 25% by weight, based on the amount of A), B) and C).

The copolymers according to the invention may also contain further olefinically unsaturated monomers in amounts of up to 35% by weight such as (meth)acrylamides, such as acrylamide and methacrylamide, acrylonitrile, methacrylonitrile, diacetoneacrylamide, hydroxyalkyl (meth)acrylates, such as 2-hydroxyethyl (meth)acrylate and 4-hydroxybutyl (meth)acrylate, furthermore monomers such its 2-ketobutyl (meth)acrylate, N-vinylpyrrolidone, N-vinylformamide, N-vinylcaprolactam, tetrahydrofurfuryl 2-acrylate, tetrahydrofurfuryl 2-methacrylate or tetrahydrofurfuryl-2-(meth)acrylamide, and styrene, α-methylstyrene, ethylene, propylene, isobutene, butadiene or isoprene.

For specific applications, it is also possible for small amounts of the following monomers, for example in amounts of from 0.01 to 0.5% by weight, based on the sum of the weights of the monomers to be present: vinyltriethoxysilane, γ-methacryloxypropyltrimethoxysilane and vinyltris-2-methoxysilane.

Other monomers in whose presence the preparation of the copolymers according to the invention can be carried out are acrolein, methacrolein, acetoacetoxy-, ethyl acrylate, vinyl methyl ether, vinyl isobutyl ether, vinylpyridine, β-aminoethyl vinyl ether, aminopentyl vinyl ether and tert.-butylaminoethyl methacrylate, and ureido monomers, as disclosed, for example, in U.S. Pat. Nos. 2,881,155, 3,300,429 and 3,356,627, e.g. β-ureidoethyl acrylate, β-ureidoethyl vinyl ether, N-dimethylaminoethyl-N'-vinyl-N,N'-ethyleneurea and N-methacrylamidomethyl-N,N'-ethyleneurea.

In amounts of up to 10% by weight, in particular up to 6% by weight, it is also possible to use monoolefinically unsaturated monocarboxylic acids and/or dicarboxylic acids and/or anhydrides thereof, e.g. (meth)acrylic acid, maleic acid, fumaric acid, maleic anhydride, itaconic anhydride or citraconic anhydride. Acrylic acid and methacrylic acid are preferred.

Further suitable carboxyl-carrying monomers are the maleic acid, fumaric acid and itaconic acid monoesters of alkanols containing from 1 to 24 carbon atoms, it also being possible to achieve the introduction of the ester group into the copolymer by reacting copolymerized maleic anhydride with the appropriate alkanol.

Acidic monomers are also the monoamides of aliphatic, cycloaliphatic and/or aromatic amines, containing from 1 to 12 carbon atoms, of the dicarboxylic acids mentioned.

Other examples are monomers such as N-(meth)acryloylproline or N-acryloyl- or N-methacryloyl derivatives of amino acids such as glycine, alanine and 6-aminohexanoic acid, or N-acryloyl and N-methacryloyl derivatives of amino acid amides such as glycine amide or alanine amide, e.g. N-acryloylalanine. Monomers of this type are disclosed, for example, in U.S. Pat. No. 2,905,049.

Examples of suitable monomers C), are compounds of the general formula Ia

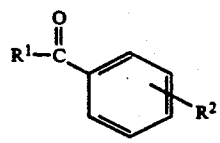
(Ia)

where the variables have the following meanings:
R¹ is CH₃ or —C₆H₅,
R² is and
R³ is —H or —CH₃.

Preference is given to compounds Ia in which R¹ is phenyl and R² is in the para-position to the carbonyl group of the phenone skeleton.

Further suitable monomers C) are compounds of the general formula II

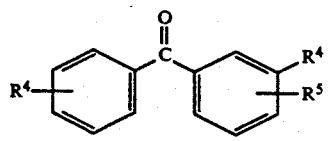
(II)

where the variables have the following meanings:
R⁴ is —H or —C$_n$H$_{2n+1}$ where n=1 to 4,
R⁵ is —O—R⁶ or

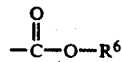

and
R⁶ is

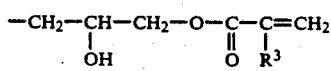

Preference is given to compounds II where R⁵ is an ester group in the para-position to the carbonyl group of the phenone skeleton. Other suitable monomers C) are compounds of the general formula III

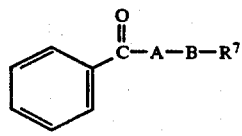
(III)

and compounds of the general formula IV

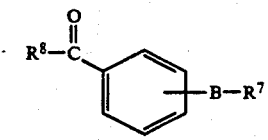
(IV)

where the variables have the following meanings:
R⁷ is

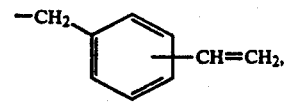

R⁸ is —CH$_n$H$_{2n+1}$ where n=1 to 3, or —C₆H₅,
A is a saturated or unsaturated, branched or unbranched hydrocarbon chain having from 1 to 3 carbon atoms or a hydrocarbon ring having from 3 to 6 carbon atoms,
B is —O—,

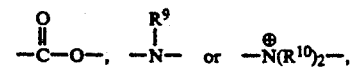

R⁹ is —H or —C$_n$H$_{2n+1}$ where n=from 1 to 8 and
R¹⁰ is —C$_n$H$_{2n+1}$ where n=from 1 to 4.

Further suitable monomers C) are compounds of the general formula V

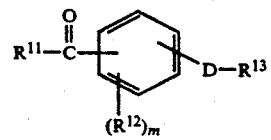
(V)

where the variables have the following meanings:
R¹¹ is lower alkyl or phenyl, it being possible for the phenyl hydrogens to be monosubstituted or polysubstituted by halogens, lower alkoxy or hydroxyl, with the proviso that no phenyl hydrogen in the orthoposition to the carbonyl group of the phenone skeleton is replaced by hydroxyl,
R¹² is halogen, lower alkoxy and/or hydroxyl, with the proviso that, where R¹² is hydroxyl, it is not in the ortho-position to the carbonyl group of the phenone skeleton,
m is from 0 to 4,
D is —O—,

an oxyalkyleneoxy chain, a carbamoylalkyleneoxy chain or an alkyleneoxy chain and
R¹³ is alkenyl or ω-carboxylalkenyl.

The monomers C) are also advantageously compounds of the general formula VI

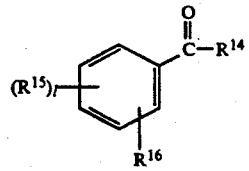
(VI)

where the variables have the following meanings:
R¹⁴ is R⁸ or phenyl, in which up to 1 hydrogen atoms may be replaced by R¹⁵,
l is from 0 to 4,
R¹⁵ is —H, —CF₃, —O—alkyl and/or alkyl—COO—, in each case having from 1 to 4 carbon atoms in the alkyl, halogen, —CN, —COOH or a —OH group which is not in the ortho-position to the carbonyl group of the phenone skeleton, $R^{16}$ is a group of the general formula VII

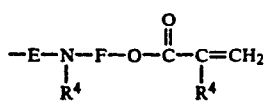 (VII)

where the variables have the following meanings:

E is

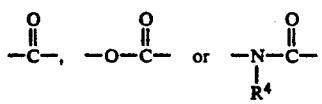

and

F is a hydrocarbon chain which has from 2 to 12 carbon atoms and may be interrupted once or more than once by oxygen atoms.

Preferred compounds VI are the acrylic and methacrylic acid esters of the alcohol of the following structure

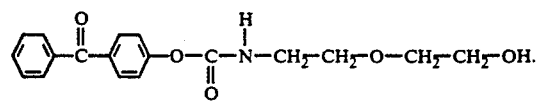

However, particularly preferred monomers C) are compounds of the general formula VIII

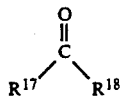 (VIII)

where the variables have the following meanings:

$R^{17}$ is linear alkyl having from 1 to 3 carbon atoms, alkyl having 3 or 4 carbon atoms in which one or more of the hydrogen atoms may be replaced by halogen atoms, or is aryl or $R^{18}$, $R^{18}$ is a radical of the formula

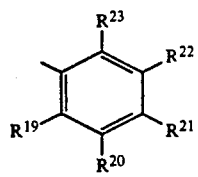

$R^{19}$ to $R^{23}$, independently of one another, are $R^4$, —OH (which must not be in the ortho-position to the carbonyl group of the phenone skeleton), —OCH$_3$, —OC$_2$H$_5$, —SH, —SCH$_3$, —Cl, —F, —CN, —COOH, —COO-alkyl having from 1 to 3 carbon atoms in the alkyl, —CF$_3$, —N(CH$_3$)$_2$, —N(C$_2$H$_5$)$_2$, —N (CH$_3$) C$_6$H$_5$, —N$^\oplus$(CH$_3$)$_5$, —N$^\oplus$(CH$_3$)$_3$X$^-$ or —N$^\oplus$(CH$_3$)$_2$X$^-$, where X$^-$ may be an acid anion such as Cl$^\oplus$, Br$^\oplus$, CH$_3$COO$^\oplus$, HSO$_4^\oplus$ or NO$_3^\oplus$, with the proviso that one or more of the radicals $R^{19}$ to $R^{23}$ is a radical of the general formula IX

 (IX)

where the variables have the following meanings:

$R^{24}$ is

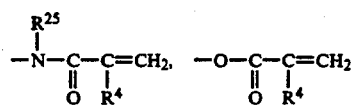

or

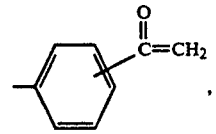

$R^{25}$ is $R^1$ or $R^4$,

G is $\{-(K)_i-J-\}_j-(K)_k$ and/or $\{-(K)_i-J-\}_j-(K)_k-J-\}_h$,

K is alkylene in which one or more of the hydrogen atoms may be substituted by halogen atoms, or is cycloalkylene containing from 5 to 10 carbon atoms or phenylene, J is —O—, —S—,

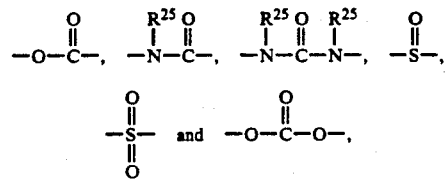

i and k are from 1 to 10 and
j and h are from 0 to 25,
where, in the compounds VIII, the monomers

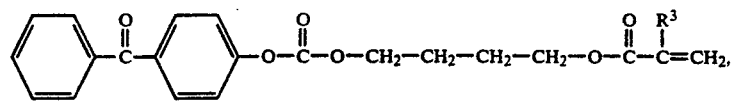

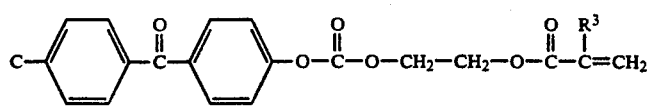

and

-continued

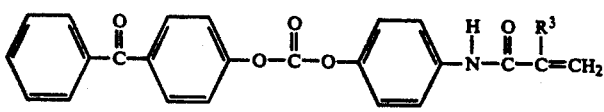

are preferred. The compounds of the general formulae I to VI and VIII are known and described, for example, in U.S. Pat. No. 3,214,492, (compounds I), U.S. Pat. No. 3,429,852 (compounds II), DE-A 28 18 763 (compounds III and IV), EP-A 246, 848 (compounds V), in the earlier German Application P 38 20 463.0 (compounds VI) and in the earlier German Application P 38 44 44.5 (compounds VIII). The copolymers according to the invention preferably contain from 0.1 to 5 % by weight of monomers C).

The copolymers according to the invention intended for adhesives generally have a glass transition temperature, measured by differential thermoanalysis, of below 0° C., preferably below −20° C., particularly preferably below −30° C., and a K value of from 15 to 120, preferably from 30 to 80, very particularly preferably from 35 to 65.

The copolymers can be prepared by conventional processes of solution, emulsion or suspension polymerization and by processes for the preparation of secondary dispersions; processes of this type are disclosed, for example, in German Laid-Open Applications DE-OS 35 43 361 and DE-OS 37 20 850.

Conventional processes for emulsion copolymerization are described, for example, in U.S. Pat. Nos. 2,754,280 and 2,795,564 and in European Patent 0 037 923. Thus, the monomers can be emulsified, for example, using an anionic, cationic or nonionic dispersant, generally in an amount of from about 0.05 to 10% by weight, based on the total weight of the monomers.

The emulsion copolymers can be prepared by step, gradient, batch or conventional feed processes or by a continuous procedure, or by processes for the preparation of secondary dispersions, as disclosed, for example, in German Laid-Open Applications DE-OS 35 43 361 and DE-OS 37 12 860.

These processes include step, gradient and customary feed processes of monomer and/or initiator (systems); emulsion polymerization processes are described, for example, in H. Bartl and J. Falbe, Houben-Weyl, Methoden der organischen Chemie, makromolekulare Stoffe, Vol. E20, Parts 1 and 2, Georg-Thieme-Verlag, Stuttgart, New York, 1987, and in Part volume 3 of the cited literature. Suitable dispersants are listed, for example in Houben-Weyl, Vol. E20, Parts 1 and 2, Thieme, Stuttgart (1987) and in the book by Stache, Tensidtaschenbuch, 2nd Edition, Carl-Hanser-Verlag, Munich, Vienna, 1981.

The preferred polymerization process is that in organic solvents.

The copolymers are prepared by bulk or preferably solution polyemmization at from 20° to 150° C., preferably from 80° to 1200° C., in the presence of from 0.25 to 10% by weight, based on the monomers, of peroxide or azo initiators and in the presence of from 0 to 200% by weight, preferably from 5 to 100% by weight, bnised on the monomers, of inert solvents.

Preferred solvents are those having a boiling range of from 50° to 150° C. and, in addition, containing small amounts of high- or low-boiling components, for example hydrocarbons, such as benzene, toluene, o-, m- and p-xylene and naphthas, preferably having a boiling range of from 60° to 120° C.

Preference is given to toluene and ethyl or butyl acetate, and furthermore ketones such as acetone or methyl ethyl ketone, and mixtures of these.

To carry out the polymerization, compounds which reduce the degree of polymerization, so-called polymerization regulators, can also be added to the reaction mixture.

The polymerization processes are described in many places in the literature and provide no special features compared therewith.

However, if the preparation of the copolymers according to the invention is carried out by solution polymerization in the presence of acids, such as acrylic acid, methacrylic acid, vinylsulfonic acid or others, the cyclic monomers of the formula I are introduced into the reaction mixture as a separate feed, if desired dissolved in the comonomers such as isoamyl acrylate or 2-ethylhexyl acrylate. It is frequently advantageous to add small amounts of an orthoester, e.g. ethyl orthoformate, in an amount of up to 2 % by weight, based on the monomers, to the monomers before addition of the monomers of the formula I. It is particularly important to ensure anhydrous conditions and to dry the starting materials, if necessary, before use.

The copolymers according to the invention are suitable, after crosslinking, as coating agents, impregnants, adhesives and in particular as contact adhesives, which can be used, preferably in solvent-free form, for example as melts, but also in dissolved form, for example as polymer solutions containing organic solvents, for coating sheet-like substrates or moldings made of metal, plastic, paper, board, leather or inorganic materials. They have excellent spreading properties and wetting behavior on a wide variety of substrates.

The copolymers according to the invention have high reactivity toward UV radiation, but thermal crosslinking is extremely poor: for this reason, addition of polymerization inhibitors is not necessary. The thermal stability allows optimum flow properties to be produced, for example by selecting the application temperature, application using a very wide variety of melt applicators, such as rollers, knife coaters, nozzles etc., in which the melts are subjected to various shear loads, being possible. UV-crosslinkable materials applied in the form of powders also produce optimum wetting at elevated temperatures.

The UV reactivity of the copolymers can be selected in such a manner that they can be handled under artificial light without crosslinking, even when the pack is open. The materials crosslink rapidly only when irradiated with UV light or when exposed directly to sunlight. The crosslinking wavelengths are preferably in the range of from 200 to 400 nm.

The materials according to the invention can furthermore be crosslinked under atmospheric oxygen; it is not necessary to use expensive inert gases such as noble gases, nitrogen or carbon dioxide.

The irradiation of the coating can be effected using commercially available UV lamps, for example mercury high-pressure or medium-pressure lamps having an output of, for example, 80 W/cm or more. It is also possible to use electrodeless UV lamps having an output of, for example, 80 W/cm or 120 W/cm (fusion system). Hot-melt adhesives applied spot by spot can be crosslinked by irradiation with the UV light from UV point or small area sources.

The UV technology is described, for example, in the book by Roger Philips, Sources and Applications of Ultraviolet Radiation, Academic Press, London, New York, 1983.

The maximum rate at which the coated substrate materials can pass through the UV irradiation zone while achieving adequate crosslinking for the particular application depends, inter alia, on the thickness of the coating, on the irradiation power and on the number of lamps and their distance from the coating surface (focusing).

A large number of lamps and high power generally facilitates a high production rate. In some cases, it may also be advantageous to use several lamps of low power instead of a few lamps of high power.

In particular, the irradiation can be effected simultaneously from both the coating side and from the substrate side if substrates (e.g. films) which are sufficiently UV transparent are used.

It should be possible to process hot-melt adhesives at the lowest possible temperature. Some of the hot-melt adhesives according to the invention can be processed at below 95° C., which means that plasticized PVC films or polypropylene films can also be coated.

Surprisingly, the hot-melt adhesives according to the invention can also be applied directly to paper or nonwovens.

The hot-melt adhesives according to the invention also permit the crosslinking of relatively thick coatings, for example thicker than 1 mm, which means that the UV-crosslinkable materials according to the invention can also be employed as sealants and/or adhesive sealants.

The novel hot-melt adhesives can easily be applied to sheet-like structures, such as films, paper, board, fabric, leather, and to wood, metals, rubber and glass using conventional hot-melt adhesive applicators, for example slot dies, knife coaters and by screen printing, where appropriate also by transfer application. Films which are suitable as substrates may comprise, for example, polyethylene, polyamides, polyethylene glycol terephthalate, polypropylene, polyvinyl chloride, cellulose acetate, polysiloxane or aluminum. Substrates foamed from plastics, nonwovens, textile fabrics and yarns can also be coated or, if appropriate, impregnated.

The copolymers according to the invention are used, in particular, for the production of articles with a self-adhesive finish, such as self-adhesive labels, self-adhesive tapes or adhesive tapes for medical purposes, or for the production of intermediates with a self-adhesive finish, such as self-adhesive layers for flocking.

They are distinguished, particularly at elevated temperatures, by high rolling-ball lack and high shear strength, which is one of the principal requirements of adhesives.

An important property of the copolymers according to the invention is, in this connection, their glass transition temperature Tg, which is consequently affected by the choice of monomers and their proportions. The Tg of the polymers for contact adhesives should be below 0° C. (i.e. the polymer must produce a soft coating), preferably below −10° C.

The Tg is a usual way of characterizing the hardness of a polymer; details can be found in the book by Flory, Principles of Polymer Chemistry, pages 56 and 57 (1953), Cornell University Press. Glass transition temperatures are also given in the reference work by Brandrup and Immergut, Polymer Handbook, Sec. III, Pages 61–63, Interscience 1966.

Although it is preferred that the Tg of a polymer be measured, it can, however, alternatively be calculated as indicated in the publication by Fox, Bull. Am. Physics, Soc. 1, 3, (1956), page 123.

The Tg of the copolymers according to the invention is expediently from 0 to −40° C., preferably from −10° to −30° C., and can be adjusted within substantial limits through the choice of monomers; the criteria for this are known in principle.

The adhesive bonds produced using the crosslinked copolymers according to the invention are distinguished by high shear strength and simultaneously high rolling-ball tack.

In addition, the properties of the novel contact adhesives can easily be matched to the required applications through the choice of monomer composition. Thus, it is easy to produce self-adhesive labels which can be removed from various substrates without leaving a residue (removable labels, removable adhesive tapes), and double-sided adhesive tapes, electrical insulating tapes and self-adhesive decorative films can also be produced.

The novel contact adhesives can be modified and/or formulated in a conventional manner. To this end, the conventional tackifying resins (tackifiers), for example hydrocarbon resins, modified or unmodified colophony resins, β-pinene resins, polyterpene resins, (modified) colophony resins containing metal ions, such as zinc resinates, terpenephenol resins, ketone resins, aldehyde resins, coumarone-indene resins and (di)cyclopentadiene resins, can be added to the copolymers in amounts of up to 50% by weight. Other suitable additives are homopolymers, such as poly(2-ethylhexyl acrylate) or poly(n-butyl acrylate), plasticizers, for example based on monoester, diester or polyester compounds, polychlorinated hydrocarbons or paraffin oils, dyes, pigments, stabilizers, rubber-elastic substances, such as natural rubbers or synthetic rubbers, or styrene-butadiene copolymers, polyvinyl ethers or polybutadiene oils, which can be added in small amounts. Modification using polyamides and polyesters is also possible.

APPLICATIONAL TESTING AS CONTACT ADHESIVES

The adhesive tests were carried out by coating polyethylene glycol terephthalate films (Hostaphan ® RN 36, Hoechst AG) with the hot-melt adhesives at 95° C. on a coating bench to give a coating weight of 25 g/m².

The coated films are placed on the continuous belt of a UV-irradiation unit and moved at a speed of 20 m/min under two mercury medium-pressure lamps with a power of 80 W/cm each. The irradiation is carried out in an atmospheric oxygen atmosphere.

The irradiated films are subsequently covered with paper coated with an adhesive (silicone paper), and the adhesive tests are carried out.

The films produced in this way are cut into strips 2 cm in width, and the latter are applied by means of the adhesive coating onto a chrome-plated brass plate. The plate with the strips is then stored for 24 hours at 23° C. and a relative atmospheric humidity of 65%.

In order to measure the peel strength, the test strips are peeled off backwards parallel to the adhesive coating at a rate of 300 mm/min. The force necessary to do this is measured.

The shear strength is measured on the basis of a bonded area of 20×25 mm, with the plate clamped vertically and the overhanging part of the adhesive strip being loaded with a weight of 1 kg. The time before failure of the bond is determined. The measurement is carried out at 23° C. and 50° C. All measurements are carried out 5 times.

In order to measure the loop-test score, an adhesive strip 2 cm in width and 150 Mm in length is formed into a loop, and the two ends of the adhesive strip are clamped in the jaws of a tensile testing machine. The adhesive side of the loop is brought into contact with a standard plate of stainless steel. The force necessary for removing the strip from the plate is measured. The mean is formed from six measurements.

The rolling-ball tack is determined in accordance with PSTC-6 (Pressure-Sensitive Council's Test Method No. 6): a steel ball 1.1 cm in diameter rolls onto the adhesive coating of the test strip from an inclined plane having a semicircular inside surface and a tilt angle of 21° 30'. The distance covered before the ball stops rolling is a measure of the tack. The longer the distance, the lower the tack. The test is carried out using adhesive strips with an even adhesive coating of 25 g/m². In each case, seven measurements are carried out, the smallest and largest values are discarded, and the mean formed from the remaining five values.

In the examples below, parts and percentages are by weight. The K values were determined in accordance with DIN 53 726 in a 1% strength solution in tetrahydrofuran at 25° C.

The flow curves are recorded at various temperatures using a rheomat (ball/plate system) from Haake, Karlsruhe, with computer-supported evaluation in a shear rate range of from 100 l/s to 500 l/s.

The examples below illustrate the invention in greater detail.

EXAMPLE 1 (K1)

A mixture of 200 g of toluene, 100 g of a monomer mixture comprising 850 g of i-amyl acrylate, 91 g of 1-methylene-1,3-dioxepan, 59 g of methyl acrylate and 6.5 g of the benzophenone derivative of the formula

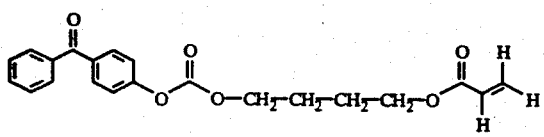

and 3 g of tert.-butyl per-2-ethylhexanoate (tert.-butyl peroctanoate) is polymerized initially at from 85° to 95° C. for 15 minutes. The remainder of the monomer mixture and a solution of 23 g of tert.-butyl peroctdnoate in 50 g of toluene are added over the course of 4 hours. When addition is complete, the mixture is stirred for a further 4 hours at an internal temperature of from 80° to 00° C.

The solvent and the volatile constituents are subsequently removed by distillation.

A copolymer which is free-flowing at room temperature and has a K value of 45.6 is obtained.

The melt viscosity at 121° C. is 8300 mpa.s (D=310 l/s).

COMPARATIVE EXAMPLE (K2)

A monomer mixture comprising 500 g of 2-ethylhexyl acrylate, 350 g of n-butyl acrylate and 150 g of methyl acrylate, and 6.5 g of the benzophenone derivative (IV) is polymerized as described above, to give a copolymer having a K value of 44.

THERMAL STABILITY TEST

In order to test the thermal stability, a sample of about 10 g is distributed on an aluminum sheet and heated at 150° C. for two hours. After cooling, the polymer film is transferred into a Petri dish and covered with d solvent, generally ethyl acetate. After waiting for 24 hours, the sample is investigated for undissolved constituents and gel particles.

In order to test for UV reactivity after conditioning, a sample is first heated at 150° C. for 2 hours as described above.

The sheet with the sample distributed thereon is subsequently divided, and one half is irradiated for 15 seconds with a mercury lamp at a distance of 10 cm (Uvaspot 400 K, Dr. Hönle).

Since the crosslinking of the copolymers is also dependent on the lamps used and on how long they have been used, the irradiation energy of the lamps is given in the table below as a function of the belt speed.

TABLE 1

Irradiation energy as a function of the belt speed and the number of lamps operated

| Belt speed [m/min] | Irradiation energy* [J/cm²] | |
|---|---|---|
| | 1 lamp | 2 lamps |
| 10 | 0.170 (A) | 0.347 (AA)** |
| 15 | 0.124 (B) | 0.258 (BB) |
| 20 | 0.093 (C) | 0.194 (CC) |

*Measured using an UVICURE UV CURING RADIOMETER S/N 0588047 from EIT-Electronic Instrumentation and Technology, Inc.
**The combination of letters indicates the irridation conditions.

EXAMPLES; UV-REACTIVE CONTACT ADHESIVE + TACKIFIER

In order to modify the UV-reactive hot-melt adhesive of Example 1 (K1), 150 g of the copolymer were in each case mixed with a commercially available colophony resin, Foral ® 85 from Hercules Inc.

| Mixture | K1 | Foral 85 |
|---|---|---|
| (K3) | 200 g | 20 g |
| (K4) | 200 g | 30 g |

TABLE 2

Results of applicational testing as a contact adhesive

| Sample | Irradiation conditions | Shear strength (hours) at | | Peel strength [N, cm²] | |
|---|---|---|---|---|---|
| | | 23° C. | 50° C. | Immed. | After 24 hrs. |
| K 1 | (BB) | >24 | >24 | 3.8 | 10.7 |
| K 2 | (CC) | >24 | >24 | 8.3 | 11.2 |
| K 3 | (BB) | >24 | >10 | 5.6 | 12.2 |
| K 4 | (AA) | >24 | >10 | 6.0 | 12.8 |

TABLE 2-continued

Results of applicational testing as a contact adhesive

| Sample | Irradiation conditions | Rolling-ball tack [cm] | Loop-test score [N/cm$^2$] | Finger tack* score |
|---|---|---|---|---|
| K 1 | (CC) | 5.5 | 6.9 | 4 (very good) |
| K 2 | (CC) | >20 | 7.4 | 3 (good) |
| K 3 | (B) | 5.0 | 7.5 | 4 (very good) |
| K 4 | (CC) | 4.0 | 8.0 | 4 (very good) |

*The finger tack was assessed by means of a group. Scores were given on a scale extending from 4 (very good tack) to 1 (adequate tack).

TABLE

| Testing of the thermal stability and UV reactivity | | |
|---|---|---|
| Sample | Thermal stability | UV Reactivity |
| K1 | not crosslinked, no gel particles | crosslinked, swollen gel |

We claim:

1. A UV-crosslinkable copolymer comprising
   A) from 99.5 to 75% by weight of one or more monomers selected from the group consisting of monoolefinically unsaturated monocarboxylic acid esters containing from 4 to 21 carbon atoms and vinyl esters,
   B) from 0.5 to 25% by weight of one or more unsaturated compounds of he formula I

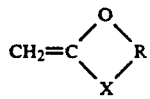

and
   C) from 0.01 to 10% by weight of one or more copolymerizable, olefinically unsaturated acetophenone and/or benzophenone derivatives containing no phenyl group having a free hydroxyl group in the ortho-position to the carbonyl group, where X is O, S or NR$^1$ and
   R is unsubstituted or substituted C$_2$- to C$_6$-alkylene, and
   R$^1$ is C$_1$- to C$_8$-alkyl or phenyl.

2. A copolymer as claimed in claim 1, containing, as component A), an acrylate and/or methacrylate of an alkanol having from 1 to 18 carbon atoms.

3. A copolymer as claimed in claim 1, containing, as component A), an acrylate of a non-tertiary C$_4$- to C$_{12}$-alkanol.

4. A copolymer as claimed in claim 1, wherein component A) is an acrylate and/or methacrylate and wherein said copolymer further comprises carboxyl-containing, unsaturated compounds other than an acrylate and/or a methacrylate.

5. A copolymer as claimed in claim 4, wherein the carboxyl-containing compound is acrylic acid, methacrylic acid, maleic acid, fumaric acid or a monoester or monoamide of maleic or fumaric acid, maleic anhydride, itaconic anhydride or citraconic anhydride.

6. A copolymer as claimed in claim 1, wherein component A) is an acrylate and/or methacrylate, and wherein said copolymer further comprises N-vinylpyrrolidone, styrene, vinyltoluene, ethene, propene, butene or butadiene.

7. A copolymer as claimed in claim 1, containing, as component B), 2-methylene-1,3-dioxepan or N-methyl-2-methyleneoxazolidine.

8. A copolymer as claimed in claim 1, containing, as monomer C), one or more of the compounds

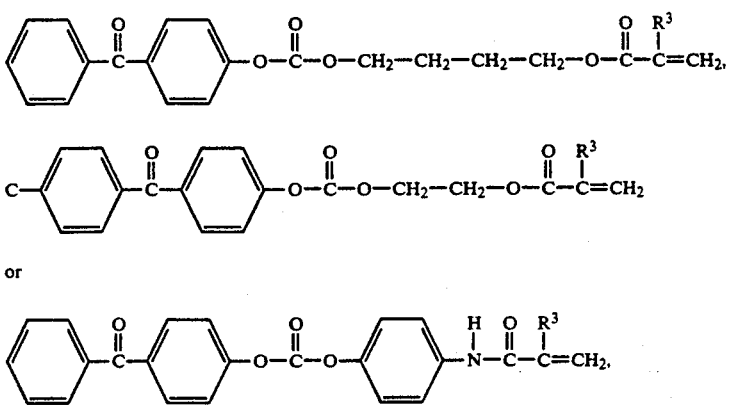

where the variable R$^3$ is hydrogen or methyl.

9. A copolymer as claimed in claim 1, which can be crosslinked by UV irradiation in the wavelength range of from 200 to 400 nm.

10. A process for the preparation of a copolymer as claimed in claim 1, which comprises reacting components A, B and C in solution.

11. A process as claimed in claim 10, carried out in the absence of water or in the presence of water-binding agents.

12. The preparation of a hot-melt adhesive comprising polymerizing a UV-crosslinkable copolymer as claimed in claim 1 having a K value of from 25 to 65.

13. A copolymer as claimed in claim 1, further comprising up to 35% by weight of one or more monomers selected from the group consisting of acrylamide, methacrylamide, acrylonitrile, methacrylonitrile, diacetoneacrylamide, 2-hydroxyethyl (meth)acrylate, 4-hydroxybutyl (meth)acrylate, 2-ketobutyl (meth)acrylate, N-vinylformamide, N-vinylcaprolactam, tetrahydrofurfuryl 2-acrylate, tetrahydrofurfuryl 2-methacrylate, tetrahydrofurfuryl-2-(meth)acrylamide, α-methylstyrene, isobutene, and isoprene.

14. A copolymer as claimed in claim 1, further comprising from 0.01 to 0.5% by weight of one or more monomers selected from the group consisting of vinyltriethoxysilane, γ-methacryloxypropyltrimethoxysilane and vinyltris-2-methoxysilane.

15. A copolymer according to claim 1, further comprising at least one monomer selected from the group consisting of acrolein, methacrolein, acetoacetoxyethyl acrylate, vinyl methyl ether, vinyl isobutyl ether, vinylpyridine, β-aminoethyl vinyl ether, aminopentyl vinyl ether, tertiary-butylaminoethyl methacrylate, β-ureidoethyl acrylate, β-ureidoethyl vinyl ether, N-dimethylaminoethyl-N-'-vinyl-N,N'-ethyleneurea and N-methacrylamidomethyl-N,N'-ethyleneurea.

* * * * *